Sept. 27, 1955 J. R. RAY 2,718,867
MATERIAL LEVEL INDICATOR FOR BIN OR BUNKER
Filed March 4, 1954
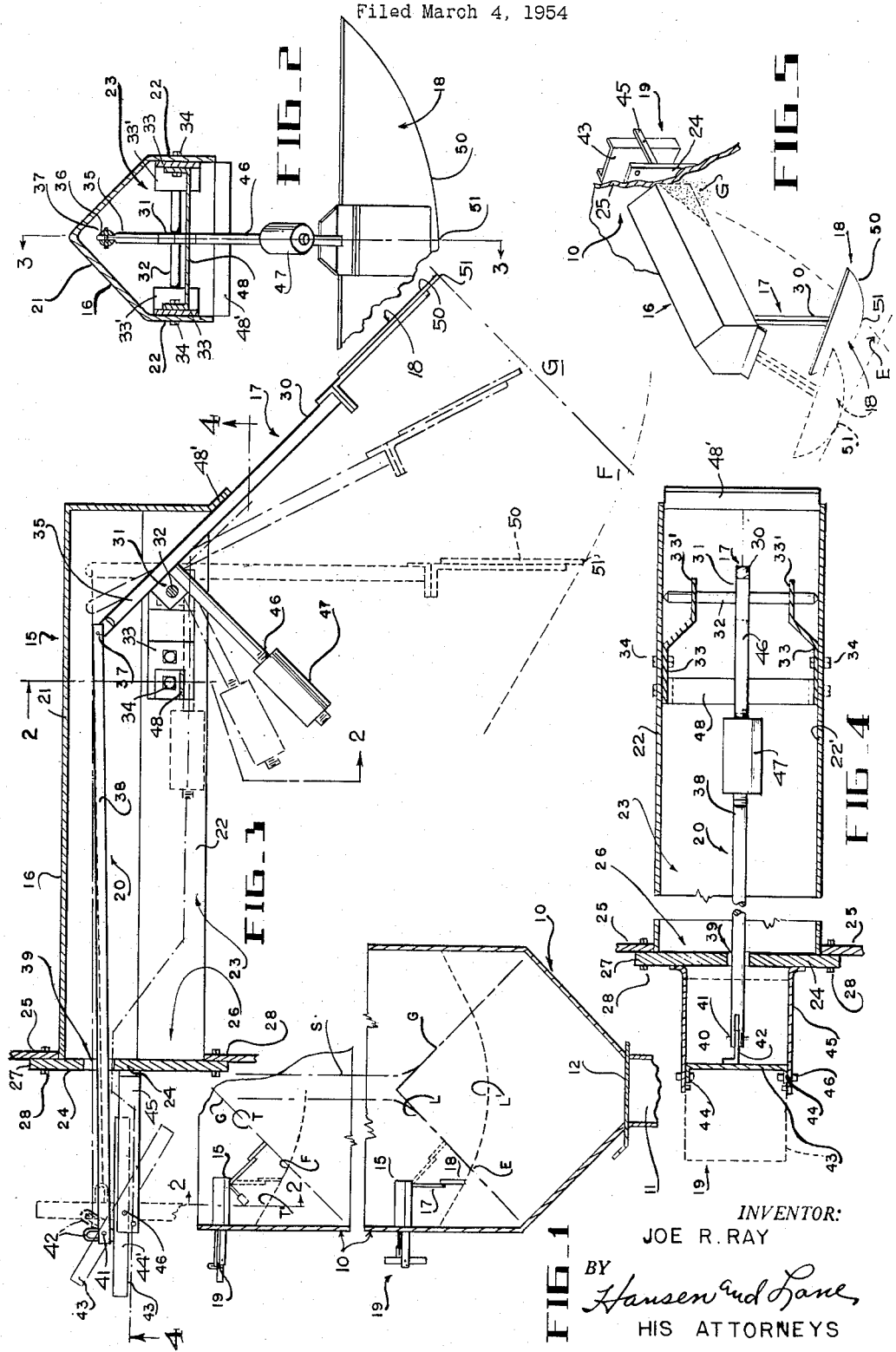
INVENTOR:
JOE R. RAY
BY Hansen and Lane
HIS ATTORNEYS

United States Patent Office 2,718,867
Patented Sept. 27, 1955

2,718,867

MATERIAL LEVEL INDICATOR FOR BIN OR BUNKER

Joe R. Ray, San Jose, Calif.

Application March 4, 1954, Serial No. 414,008

4 Claims. (Cl. 116—114)

This invention relates to material level indicators and more particularly to certain novel improvements in level indicators used in bins or bunkers for granular materials such as grain, gravel or the like.

Material level indicators of various types have been invented in the past for accomplishing the broad general result. However, these prior known devices have been unsatisfactory from several standpoints. For instance, such prior devices have been vulnerable to damage during operation due to falling material placing undue strain on leverages resulting in faulty operation. Moreover, these prior known devices seek detection by direct contact with material as it falls into the bin or bunker. The present invention contemplates the provision of a material level indicator which works equally well during discharge of the material from the bin or bunker as well as during the receipt of such material thereby.

Accordingly, it is one object of this invention to provide a material level indicator so disposed within a bin or bunker as to indicate the level of material therein during discharge as well as receipt of material relative to the same.

Another object is to provide a material level indicator disposed at the angle of recession as well as at the angle of accession of the material within a bin or bunker.

Another object is to provide a material level indicator affording a natural movement of its detecting paddle and lever with the ebb and flow of granular material about and relative to the same.

Another object is to provide a material level indicator with a detector paddle and lever disposed at a critical zone for accurate and prompt detection of the presence or absence of material relative to that zone.

It is a further object to provide a material level indicator wherein all of its moving parts are suitably and adequately guarded against undue pressure or damage resulting therefrom.

These and other objects and advantages of the present invention will become apparent from a reading of the following description and claims in the light of the drawing in which:

Fig. 1 is a fragmentary vertical section through a bunker having material level indicators embodying the present invention associated therewith.

Fig. 2 is an enlarged cross section through one of the material level indicators of Fig. 1 taken from line 2—2 therein.

Fig. 3 is a longitudinal section through the material level indicator of Fig. 2 and taken substantially along line 3—3 thereof showing parts thereof in side elevation.

Fig. 4 is a bottom plan view of the material level indicator as seen from below in Fig. 3 with parts thereof in a different position and in section taken at 4—4 therein.

Fig. 5 is a fragmentary perspective view of the material level indicator as seen from within the bunker.

The present invention as best illustrated in Fig. 1 is most suitable for use in large bunkers or hoppers such as the one indicated 10 in Fig. 1. These bunkers 10 are constructed to receive and support heavy granular substances or semi-solids such as gravel, sand, and ready mixes thereof for transmission by gravity through a funnel-shaped discharge end 11. Usually these bunkers 10 are supported at a height sufficient to pass conveyor belts or vehicles such as freight cars or trucks beneath to receive the granular material as it discharges from the funnel-shaped lower end. The discharge end 11 of these bunkers has a gate 12 of conventional design for opening or shutting off normal gravitational flow of material from the bunker.

The material level indicator embodying the present invention is best suited for batch plants where asphalt or concrete is made from various proportions of sand and gravel. It is suitable particularly for use in the intermediate storage bunkers employed in the making of asphalt in which aggregates from sands up through different sizes of gravel as screened through meshes of $3/16$ to $5/16$ inch, $5/16$ inch and $3/4$ to 1 inch, for example. Moreover, since such sands and gravels, preparatory to their use in asphalt, must be dry pre-heated to a temperature of 250° to 400° it will be appreciated that no fabric, canvas or rubber diaphragms can be used as seals or covers in the material level indicator. The material level indicator of the present invention is made entirely from metal which will withstand heat, pressure and any undue stresses or strains which might occur.

These bunkers are filled from above by overhead cranes or conveyors and as can be perceived, the persons operating the overhead cranes cannot always fell the level to which the granular substance has raised or fallen from the exterior of such bunkers. Moreover, dust clouds rise from the material as it falls into the bunker and it is impossible to see within the same to ascertain the level of the material therein.

As illustrated in Fig. 1, the granular material G is fed into the bunker from above and falls in a stream S substantially centrally thereof so that the material piles up in cone shape from a substantially central apex to a lower base level around the periphery of the bunker. Consequently, as the material G glides down from the central apex of the cone to the lower base level thereof at the periphery of the bunker, the line L of material at the side of the cone is disposed at an angle from some 30° to approximately 45° inclination relative to horizontal at the base of the cone dependent upon the type of material admitted into the bunker.

In addition to the foregoing, it will be noted that as the material G discharges from the bunker via the lower opening 11 the apex of the cone falls first and the cone tends to become inverted with low point at the center and high level around the periphery of the bunker. While the material G discharges from the bunker, the granules glide from the periphery thereof toward center and consequently there is more of a tendency of the top surface of the material to become dish-shaped as indicated by the line L'. However, during discharge of the material G the line L' of the material adjacent the periphery of the bunker tends to simulate the angle of the line L thereof during the filling operation but declines (relative to horizontal struck at the point of contact of the material with the wall of the bunker) at substantially the same angle as before for the same material.

From the foregoing it will be seen that the same quantity of material at a certain zone within the bunker during either filling or discharging operation the lines L and L' converge at substantially the same point E at about one quarter of the diametric distance inwardly from the periphery of the bunker. In other words, as illustrated in Fig. 1, when the upper surface of the material is at either line L or line L' there is approximately the same quantity of material remaining in the lower end of the bunker. By the same token, when the upper surface of the material G is a either line T or T' (see upper left-hand corner of Fig. 1) there is substantially the same quantity of material in the bunker. It will thus be apparent that there is a mean zone F adjacent the top of the bunker for detecting when the latter is full and also a mean zone E adjacent the bottom of the bunker for detecting when the latter is empty. It is at these two critical zones E and F that the material level indicator of the present invention is disposed for operation.

The material level indicator of the present invention generally designated 15 in the drawing comprises a cover bracket 16 pivotally supporting a lever 17 having a paddle 18 at its free end adapted to be engaged by the material in the bins 10 and a signal means 19 connected by linkage 20 to the lever 17 for setting up a signal or alarm.

The indicator 15 briefly explained above is a complete unit adapted for placement in any of the presently known forms of bunkers or bins within which the accession or recession of granular material affords a critical zone of detection such as the zones E and F attained as hereinbefore explained.

The cover bracket 16 comprises a metal plate 21 bent midway its ends (Fig. 2) to provide a pair of downwardly directed flanges or legs 22—22' parallelly disposed. The shape crosswise the cover plate 21 may be arcuate but I prefer to form the same as an inverted V to form a housing or guard 23 as illustrated in Figs. 2 and 3. In this manner the cover bracket 16 and housing or guard 23 cooperate to form a very rigid support for the inner leverages and linkages confined within the same. One end of the combined bracket and cover (16—23) is secured as by welding to a mounting plate 24 which extends sufficiently from the girth of the guard 23 to bear against the outer side wall 25 of the bunker 10. The cover or guard portion 23 itself extends through an opening 26 in the wall 25 in cantilever fashion and the flange 27 of the mounting plate 24 to the wall 25 is secured exteriorly of the bunker by bolts 28 thereby also sealing the opening 26 in wall 25.

As best seen in Fig. 2, the combined bracket and housing is an inverted V in cross section with the two legs 22—22' parallel and spaced from one another sufficiently to clear the lever 17 now to be explained. The lever 17 constitutes a relatively long arm 30 having an offset block 31 welded adjacent one of its ends and suitably secured as by welding to a cross shaft 32, the ends of which extend to either side of the arm 30 in trunnion fashion but in offset relation with respect thereto. The shaft 32 is of a length to fit between the legs 22—22' of the cover bracket and has journaled support in bearings 33—33 suitably secured by bolts 34 to the legs 22—22', respectively, of the bracket 16. As best seen in Fig. 4, the bearings 33—33 are straps secured as aforementioned and having inwardly offset portions 33'—33' bored to receive the trunnion shaft 32. In addition thereto, it will be noted that each end of the shaft 32 is cone-shaped for point engagement rather than surface contact with the inner faces of the legs 22—22' of the cover bracket 16. Thus no dirt or dust can collect between the ends of the shaft 32 and the cover member.

The arm 30 of lever 17 has stub end 35 which extends upwardly from the block 31 in which the trunnion shaft 32 is secured. The extreme end of the stub 35 is flattened and bored as at 36 parallel to the axis of the shaft 32 for pivotal connection as at 37 to one end of the linkage 20 hereinbefore mentioned. This linkage 20 constitutes a stiff rod 38 having its opposite end extended through a passage 39 formed in the mounting plate 24. The passage 39 is narrow horizontally but elongated vertically to afford up and down movement of the rod 38, the opposite end 40 of which is pivotally connected as at 41 to an upstanding slotted lip 42 forming a part of the signal means 19 hereinbefore mentioned.

The signal means 19 may take any well known form but for best performance under the circumstances, I prefer a sight type signal which will not become faulty due to dust or particles of grit and the like. The signal means 19 comprises a rocker type flag 43 in the form of a pan having downturned flanges 44—44' at its sides. A pair of brackets 45 extend rearwardly from the mounting plate 24 to embrace the flanges 44—44' of the flag pan and the latter is pivotally connected to the spaced brackets 45 by headed pins 46 extended through the respective side flanges 44—44' as seen in Figs. 3 and 4. It will thus be seen that when the linkage 20 is shifted axially inwardly of the bunker 10, the flag pan 43 will be rocked clockwise (Fig. 3) from a horizontal toward a vertical position. Contrariwise, when the linkage 20 is shifted axially outwardly relative to the bunker 10, the flag pan 43 will be rocked counter-clockwise (Fig. 3) toward horizontal position. It should here be realized that the pan 43 can support a switch of the mercury globe type for making or breaking a circuit having a bell, buzzer or a lamp which will set up an alarm.

The lever arm 30 is counterweighted by a rearwardly extending leg 46 threaded to receive a weight 47 in a desired position to counteract the normal tendency of the arm 30 to hang vertically. The leg 46 as best seen in Fig. 3 is welded to the lower face of the block 31 through which the trunnion shaft 32 extends and is therefore so disposed relative to the axis of the shaft 32 as to extend rearwardly from the arm 30 when the latter is vertically disposed (see dotted line illustration Fig. 3). Thus it will be seen that the leg 46 engages a cross strap 48 extending between the portions of the straps 33—33 and secured therewith to the legs 22—22' of the cover 16 by the bolts 34.

The counterweight 47 serves to balance the arm 30 for radial extension from its trunnion shaft 32 and into engagement with a stop lip 48' provided at the inner end of the cover bracket 16. Thus the lever arm 30 is normally disposed at an angle which is substantially perpendicular to the line L of repose of the granular material within the bin or bunker 10. Moreover, when the lever arm 30 is normally disposed in engagement with the stop lip 48; i. e., at right angles to the line L, by action of the counterweight 47, the latter functions to shift the rod 38 axially outwardly to rock the flag pan 43 into empty position or from circuit breaking to circuit opening condition if an electrical switch be used as explained above.

The free or lower end of the lever arm 30 has the paddle 18 secured thereto. This paddle 18 is preferably broad with an arcuate lower edge 50 so as to tangently engage at its tip 51 the upper level of the granular material G. It should here be noted that the entire detector unit 15 extends radially relative to the central vertical axis of the bunker and the cone shape of the material G within the same. The placement of the unit 15 within the bunker 10 is such that the tip 51 of arcuate edge 50 of the paddle 18 is disposed within the critical zone E or F as the case may be so as to immediately detect the accession or recession of the granular material above or below the tip 51 of the paddle 18.

In this connection, it is important to note that the tip 51 of the paddle is always disposed at the critical zone F or E in any installation. Moreover, as previously explained the lever arm 30 is normally disposed at substantially right angles to the line L or the upper surface of the material G as it stacks up within the bunker 10.

From the foregoing it will be seen that the lever arm 30 is below the cover 16 and therefore is guarded during the falling of the granular material G into the bunker 10. As previously explained, the granular material falls into the bunker along the stream S which is substantially at the central axis of the bunker. It should be understood, however, that some deviation from this stream can be expected, but since the lever arm 30 is guarded as aforementioned, damage thereto is minimized if not avoided.

As the granular material flows into the bunker 10 and piles up in cone fashion the line L of downwardly gliding material rises until the tip 51 of the paddle on the lowermost unit 15 is engaged by the material gliding down the side of the cone-shaped pile. In this manner the detector paddle 18 is gradually moved in the direction of the flow of the granular material. Thus the lever arm 30 is rocked against the action of the counterweight 47 (counterclockwise Fig. 5 or clockwise Figs. 3 and 4). Ultimately the arm 30 becomes disposed vertically, i. e., pendently suspended from its trunnion pin or shaft 32. It should here be noted that the counterweight 47 rises up to a position parallel to and between the legs 22—22' of the cover bracket 16 (see Figs. 3 and 4). The movement of the counterweight in a clockwise direction (Fig. 3) is limited by engagement of the leg portion 46 thereof with the stop strap 48 and since the leg 46 is at right angles with respect to the lever arm 30 the latter will hang downwardly. In this position the counterweight 47 is concealed and guarded by the cover 16 while the lower extremity of the arm 30 and paddle 18 become embedded in the granular material.

As a result of the foregoing operation the rod 38 is shifted axially away from the signal means 19 and the flag pan 43 is rocked from horizontal to vertical condition. It should here be understood that by reason of the fact that the rearmost end 40 of the rod 38 has its pivot pin 41 disposed in the slot forward in the slotted lip 42 there is a lost motion action afforded in the rocking of the flag pan 43 during shifting of the rod 38 forwardly i. e., inwardly relative to the bunker 10. Consequently during initial movement of the paddle and lever arm by the granular material, say from the full line position Fig. 3 to the dot-dash position therein, the action at the rearmost end 40 of the rod 38 produces a greater part of the swing of the flag pan 43 from horizontal toward vertical position.

Thereafter, the combined movement of the lever arm 30 from dot-dash position to dotted line position (Fig. 3) results in a lost motion action between the pivot pin 41 and the slotted lip 42. Thus it will be seen that the moment that the paddle and lever arm commence to move by engagement of granular material during accession thereof into the bunker sets up an alarm at the signal 19 to indicate that there is granular material at the empty zone E. The foregoing operation is repeated with respect to the uppermost unit 15 to set up a signal or alarm to the effect that there is granular material at the full zone F within the bunker 10.

When the gate 12 at the lower end of the bunker is opened allowing the granular material to fall through the funnel shaped discharge end 11 thereof, the upper surface of the granular material sinks along the central axis of the bunker. As hereinbefore explained, the upper surface of the granular material within the bunker assumes a shape substantially converse to the normally upstanding cone; see again the line L' as indicative of this shape. In this condition, the granular material is highest around the peripheral wall of the bunker and glides downwardly at an angle toward the central axis of the bunker.

With the foregoing in mind, it will be noted that as the upper surface of the granular material recedes to the line L' or T' relative to the unit 15 the flow of such material toward the center of the bunker tends to urge the paddle 18 in the same direction. However, since the paddle 18 is now embedded in the granular material any motion of the paddle and lever arm back toward normal position is resisted even though the upper strata of the granular material is gliding downwardly toward the center of the bunker. In other words, it is not until the downwardly gliding material reaches a strata within which the tip 51 of the paddle is confined that motion of the paddle with the downwardly gliding material takes place. Therefore it is not until the tip 51 of the paddle is released from the effect of the resistance or motion of the granular material that the counterweight 47 fully influences the return of the lever arm and paddle back toward normal position. Of course the paddle 18 would normally fall in that direction due to the counter-balance action of the counterweight 47 should the level of the granular material suddenly drop below the tip 51 of the paddle 18.

In the event this movement of the paddle and lever arm back to normal position (from dotted toward full lines in Fig. 3 of the drawings) causes the linkage 20 to move the flag pin 43 back toward horizontal position. However, since the first part of the movement of the linkage rod 38 goes through the lost motion stage at the pin 41 and slotted lip 42, only a slight change if any is afforded in the disposition of the flag pan 43. In other words, during the time the tip 51 of the paddle is released from the granular material as the latter recedes and the action afforded by the counterweight 47 little change is effected in the signal means 19. This is advantageous from the standpoint of maintaining the signal means in full indicating position because in batch plants the granular material is usually being fed continuously into the bunkers to replenish the supply. Consequently there is an ebb and flow effect by the accession and recession of the granular material relative to the bunker, the flag pan 43, waving to and fro between vertical and biased position, as seen in dotted lines (Fig. 3). Only when the flag 43 on the upper unit 15 is in full or vertical position would the supply of the material into the bunker be stopped. In this manner, the person at the controls of the supply to the bunker can skillfully maintain a balance of material therein by watching the position of the flag 43.

With the material level indicator of the present invention the signal is prompt and the quantity of material at either empty zone E or full zone F is substantially the same whether material is being received by or discharged from the bunker. This is so because the indicator paddle 18 is set at a point within the bunker where the angular top surfaces of the bulk material converge whether on incoming cone or on discharging inverted cone. In other words, whether the material is coming in or discharging, there is substantially the same amount of granular material in the bunker when the top surface of such material is at line L—T or line L'—T' since these lines converge at the quarter point (zone E or F) relative to the width of the bunker. This gives an accurate account of the quantity of material within the bunker at the moment the signal is set up or cut off. Moreover, with the present arrangement all working parts are well guarded within the combined cover and bracket and while the lower end of lever arm 30 and the paddle 18 contact the granular material they are so disposed with respect thereto as to receive a minimum of strain therefrom. In other words, the fluctuation of the lever and paddle is between two positions either of which is clear of any undue thrust or downward pressure from such material during the ebb and flow thereof relative to the bunker and as a result continuous accurate operation is assured.

While I have described my improved material level indicator in specific detail, it will be apparent to those skilled in the art that it is susceptible to alteration, varia-

What I claim as my invention and desire to protect by Letters Patent is:

1. A material level indicator comprising a cover bracket supported in cantilever fashion within a bunker in which the upper surface of granular material assumes a cone shape from the central axis to the periphery of such bunker upon accession of such material within the same and substantially an inverted cone-shape upon recession of such material from said bunker providing a critical zone within said bunker where the upper surfaces of the granular material for a predetermined quantity of such material converge upon accession or recession of the material relative to said bunker; axially aligned bearing members secured to and within said cover adjacent the inner end of said bracket, stop means on said inner end of said bracket, a lever arm having a trunnion shaft secured thereto adjacent its upper end journaled in said axially aligned bearings so that said lever arm hangs downwardly with its lower end disposed on one side of said critical zone, a counterweight on said lever arm for balancing the latter in a position to dispose said arm against said stop means substantially perpendicular to the angle of repose of the upper surface of said granular material during accession thereof relative to said bunker to dispose the lower end of said lever arm on the other side of said critical zone, signal means secured to the outer end of said cover bracket exteriorly of said bunker, a linkage having one end pivotally secured to the upper end of said lever arm and its opposite end disposed for connection to said signal means, and a lost motion connection between said signal means and opposite end of said linkage for effecting prompt actuation of said signal means upon initial movement of said lever arm during accession of granular material into said bunker and for delayed actuation of said signal means during recession of granular material from said bunker.

2. A material level indicator comprising a cover bracket supported in cantilever fashion within a bunker in which the upper surface of granular material assumes a cone shape from the central axis to the periphery of such bunker upon accession of such material within the same and substantially an inverted cone-shape upon recession of such material from said bunker providing a critical zone within said bunker where the upper surfaces of the granular material for a predetermined quantity of such material converge upon accession or recession of the material relative to said bunker; axially aligned bearing members secured to and within said cover adjacent the inner end of said bracket, stop means on said inner end of said bracket, a lever arm having an offset block secured thereto adjacent its upper end, a trunnion shaft on said offset block journaled in said axially aligned bearings so that said lever arm hangs downwardly with its lower end disposed on one side of said critical zone, a counterweight on said lever arm for balancing the latter in a position to dispose said arm against said stop means substantially perpendicular to the angle of repose of the upper surface of said granular material during accession thereof relative to said bunker to dispose the lower end of said lever arm on the other side of said critical zone, a paddle on the free end of said lever arm disposed in said critical zone, signal means secured to the outer end of said cover bracket exteriorly of said bunker, a linkage having one end pivotally secured to the upper end of said lever arm and its opposite end disposed for connection to said signal means, a lost motion connection between said signal means and said opposite end of said linkage for effecting prompt actuation of said signal means upon initial movement of said lever arm by contact of said paddle with said granular material during accession thereof into said bunker and for delayed actuation of said signal means during recession of granular material from said bunker, and means adjacent said aligned bearings engageable by said counterweight for limiting movement of said lever arm beyond vertical position by action of said granular material during accession thereof relative to said bunker.

3. A material level indicator comprising a cover bracket supported in cantilever fashion within a bunker in which the upper surface of granular material assumes a cone shape from the central axis to the periphery of such bunker upon accession of such material within the same and substantially an inverted cone-shape upon recession of such material from said bunker providing a critical zone within said bunker where the upper surfaces of the granular material for a predetermined quantity of such material converge upon accession or recession of the material relative to said bunker; axially aligned bearing members secured to and within said cover adjacent the inner end of said bracket, stop means on said inner end of said bracket, a lever arm, a trunnion shaft secured to said lever arm adjacent its upper end journaled in said axially aligned bearings so that said lever arm hangs downwardly with its lower end disposed on one side of said critical zone, and having conical ends the apexes of which engage the side walls of said cover bracket, a counterbalance arm secured to said lever arm adjacent and below said trunnion shaft, a counterweight on said counterbalance arm for balancing the lever arm in a position to dispose said arm against said stop means in a position substantially perpendicular to the angle of repose of the upper surface of said granular material during accession thereof relative to said bunker to dispose the lower end of said lever arm on the other side of said critical zone, signal means pivotally mounted on the outer end of said cover bracket exteriorly of said bunker, a linkage having one end pivotally secured to the upper end of said lever arm and its opposite end extended through the side wall of said bunker for connection to said signal means, a pin and slot connection between said signal means and said opposite end of said linkage so constructed as to effect prompt actuation of said signal means upon initial movement of said lever arm during accession of granular material into said bunker and for delayed actuation of said signal means during recession of granular material from said bunker, and a cross strap within said cover bracket parallel to and spaced from said trunnion shaft to engage said counterbalance arm for limiting swinging movement of said lever arm beyond vertical position during accession of granular material into said bunker.

4. A material level indicator comprising a tent-like cover bracket supported open side down and in cantilever fashion within a bunker in which the upper surface of granular material assumes a cone shape from the central axis to the periphery of such bunker upon accession of such material within the same and substantially an inverted cone-shape upon recession of such material from said bunker providing a critical zone within said bunker where the upper surfaces of the granular material for a predetermined quantity of such material converge upon accession or recession of the material relative to said bunker; axially aligned bearing members secured to and within said cover adjacent the inner end of said bracket, a lever arm having a trunnion shaft secured transversely thereof adjacent its upper end journaled in said axially aligned bearings so that said lever arm hangs downwardly with its lower end disposed on one side of said critical zone, a counterweight on said lever arm for balancing the latter in a normal position to dispose said arm substantially perpendicular to the angle of repose of the upper surface of said granular material during accession thereof relative to said bunker to dispose the lower end of said lever arm on the other side of said critical zone, a paddle on the free end of said arm within said critical zone, signal means pivotally mounted on the outer end of said cover bracket exteriorly of said bunker, a linkage having one end pivotally secured to the upper end of said lever arm and its opposite end extending through the side wall of said bunker for connection to said signal means, and a lost motion connection between said signal means and said opposite end of said linkage for actuating said signal means promptly upon initial movement of said lever arm upon engagement of said paddle by said granular material during accession of granular material into said bunker and for delaying actuation of said signal means upon initial movement thereof back toward normal position during recession of granular material from said bunker.

References Cited in the file of this patent

UNITED STATES PATENTS

| | | |
|---|---|---|
| 781,444 | Moebeck | Jan. 31, 1905 |
| 805,102 | Swanson | Nov. 21, 1905 |
| 2,627,244 | Herigstad | Feb. 3, 1953 |